United States Patent [19]

Freer et al.

[11] 4,391,491
[45] Jul. 5, 1983

[54] PASSIVE ELECTRO-OPTIC DISPLAY CELL AND METHOD OF MANUFACTURING THEREOF

[75] Inventors: William G. Freer, Saint-Blaise, Switzerland; John C. Varney, Staines, England; John H. Williamson, Neuchatel, Switzerland

[73] Assignee: Ebauches Electroniques, S.A., Canton of Neuchatel, Switzerland

[21] Appl. No.: 160,748

[22] Filed: Jun. 18, 1980

[51] Int. Cl.³ .................................................. G02F 1/13
[52] U.S. Cl. ..................................... 350/341; 350/343
[58] Field of Search ...................... 350/339 R, 341, 343

[56] References Cited

U.S. PATENT DOCUMENTS 3,994,567  11/1976  Matsuo et al. .................. 350/343 X
4,252,414   2/1981  Kinugawa et al. ............. 350/339 R

FOREIGN PATENT DOCUMENTS 51-94846  8/1976  Japan ............................. 350/339 R
54-49155  4/1979  Japan ............................. 350/339 R

OTHER PUBLICATIONS

Licari, James J., *Plastic Coatings for Electronics*, (McGraw-Hill, New York 1970), pp. 57-64, 99-102.

Primary Examiner—John K. Corbin
Assistant Examiner—Richard F. Gallivan
Attorney, Agent, or Firm—Silverman, Cass & Singer

[57] ABSTRACT

A passive electro-optic display cell comprises two glass plates each of which is covered with a protective layer, for example of silicon dioxide, on which are fixed conductive electrodes composed, for example, of indium oxide. A bonding layer is placed between each plate so treated and an alignment layer which aligns the molecules of a liquid crystal within the cell, this bonding layer being produced from a transparent organic substance, for example a silane or an aluminate. The alignment layers are composed of a polymerizable material, for example a polyimide. A sealing frame which surrounds the liquid crystal between the plates is likewise composed of a polymerizable material, for example a formaldehyde phenolic resin. A copolymerization of the sealing frame and the two alignment layers is obtained, so that these three elements form a casing which encloses the liquid crystal and protects it against contamination and from external influences. The protective layer prevents ions which originate from the plates from diffusing within the cell.

10 Claims, 1 Drawing Figure

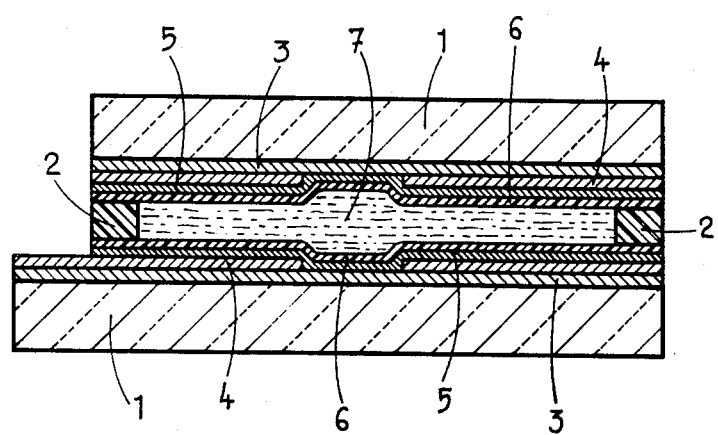

PASSIVE ELECTRO-OPTIC DISPLAY CELL AND METHOD OF MANUFACTURING THEREOF

BACKGROUND OF THE INVENTION

The present invention relates to a passive electro-optic display cell comprising two glass plates spaced apart by a frame positioned between them, thus providing an enclosed space in which a liquid crystal is imprisoned. On their inner faces these plates carry control electrodes and, in each case, a layer for alignment of the molecules of the active constituent of the cell. The invention also includes a method of manufacture of such a cell.

The object of the invention is to overcome problems which the mass-production of liquid crystal display cells presents. Two types of problems are posed, firstly those which are concerned with a reduction of the necessary handling operations, in order to increase productivity, and secondly those which relate to the quality of the product obtained, especially to effective product life.

The first type of problem has already been dealt with by implementing methods enabling simultaneous production of a series of cells (see Swiss Pat. No. 11.387/78). It is to the second type of problem that the present invention is principally directed.

It is advisable to point out that the cell which forms the subject of the present invention, as well as its method of manufacture, does not rule out mass-production, quite the contrary being the case. Thus, the different layers of which the cell are composed are all applied over large surfaces, which allows them to be applied to glass plates the dimensions of which are larger than those of the plates of each cell and which are then broken up with the object of separating the individual cells which are so produced.

Frequently observed faults in passive electro-optic cells and which the invention aims to remove, or at least reduce, are as follows;

Formation of micro-areas in the display zones (segments) producing the so-called "reverse tilt" phenomenon, which affects the uniformity of the activated segments.

Increase, with time, of the current which serves to control the display.

Loss of alignment after a long period of operation or, more rapidly, after operation at high temperatures.

The three drawbacks mentioned above are all due to the progressive dissolution of the alignment layers, especially when such layers are organic, because of the solvent effect of the liquid crystal, and due to the penetration of impurities into the liquid crystal which is inadequately protected. These impurities originate from the sealing frame of the cell, from its glass plates or from the layers which the latter carry, and they migrate by diffusion.

Another drawback which the display cells with a plastics sealing frame frequently possess is the sharp increase in the operating current which occurs when they are in a humid atmosphere, owing to the weak bonding between the sealing frame and the cell plates, which results in water molecules readily diffusing into the cell.

A loss of potential through the insulating layers which normally cover the electrode networks, to provide protection against direct current, is also detected. This loss of potential adversely affects the electrio-optic behaviour of the cell.

Finally, the formation of a marginal halo around the activated display segments, resulting in too small an angle of tilt of the molecules in relation to the alignment layer, is a further drawback which should be mentioned.

SUMMARY OF THE INVENTION

The object of the invention is to provide means by which all of the aforementioned drawbacks can be reduced or overcome.

The various features of the invention will be apparent from the following description, drawing and claims, the scope of the invention not being limited to the drawing itself as the drawing is only for the purpose of illustrating a way in whch the principles of the invention can be applied. Other embodiments of the invention utilising the same or equivalent principles may be used and structural changes may be made as desired by those skilled in the art without departing from the present invention and the purview of the appended claims.

BRIEF DESCRIPTION OF THE DRAWING

The drawing shows one preferred embodiment of the invention. The single drawing FIGURE is a cross-sectional view of a passive electro-optic display cell providing that embodiment.

DESCRIPTION OF THE PREFERRED EMBODIMENT

The cell shown comprises two glass plates 1, which are located opposite to each other and maintained in spaced parallel relationship by an impervious sealing frame 2 composed of a polymerizable substance, for example a formaldehyde phenol resin.

The inner faces of the two glass plates 1 which face each other are completely covered by a protective layer 3, for example of silicon dioxide, with a thickness of approximately 800 Å, the effect of which is mainly to prevent diffusion within the cell of ions originating from the plates 1.

Electrodes identified by reference 4 produced, for example, from indium oxide and having a thickness of approximately 400 Å are applied to each of the protective layers 3.

The electrodes 4 are themselves covered by a bonding layer 5 of a transparent organic substance, for example an organo-silane, an organo-aluminate or an organo-silicate. The layers 5 themselves are each covered with a layer which acts to align the molecules of a liquid crystal 7 imprisoned between the plates 1 within the frame 2. The alignment layers 6 are produced from a polymerizable substance, for example from a polyimide. The thickness of the layers 5 and 6, considered together, will be of the order of approximately 50 to 500 Å.

Production of the cell described and illustrated is effected either on an individual piece-by-piece basis, or collectively using glass plates of dimensions larger than the finished cells, in the following way:

The plates 1 are first of all covered with the protective coating layer 3 of silicon dioxide by a pulverisation or evaporation process in a vacuum.

The so-coated plates are then provided over the whole of their coating with a thin transparent conductive film which provides the electrodes 4, this film being deposited by evaporation or by polymerization. The conductive material is removed by photochemical means where its presence is not required, thus producing on each plate 1 the desired network of electrodes (or counter-electrodes) and their electrical connection tracks. It should be noted that when the cell is not intended to be controlled in multiplex fashion, its counter-electrode can cover the whole of the corresponding plate without any continuity resolution.

Each plate is then provided with its bonding layer 5, which provides the interface between the adjoining alignment layer 6 and the substratum. The organic silane or the organic aluminate or even the organic silicate forming the bonding layer 5 is applied in solution, which presents no difficulty, by centrifuging for example, the solvent then being evaporated off by drying.

The alignment layer 6 of polyimide is then applied in the same way to each plate in the non-polymerized state, from a solution which remains non-polymerized after drying.

The two alignment layers 6 are then each rubbed in one direction by means of a soft tissue, so that the operation thereof is ensured, this resulting in the production of the desired alignment of the liquid crystal molecules. It must be ensured that this rubbing of each plate is carried out in a direction such that, when the plates are assembled together to form the cell, the two directions of rubbing are mutually perpendicular.

The frame 2 consisting of plastics material dissolved in a solvent is then applied by the silk screen process to one of the plates, giving the material so applied a thickness of approximately 15 microns after drying.

The two plates are then assembled with the frame 2 positioned between them. The assembly is heated, for example at a temperature of approximately 100° to 150° C., in order to melt the material of the frame 2. Once this material has melted, pressure is exerted on the two plates 1 such that the distance between them is brought substantially to the desired spacing. It is also possible to provide the material of the frame 2 with spacing elements, for example balls, which do not soften under the action of heat and thus which precisely determine the final spacing of the plates. In practice, this spacing will be approximately 8 microns.

It should be noted that the temperatures which are utilised in order to melt the plastics material of the frame 2, in the present case a formaldehyde phenol resin, in no way affect the polyimide alignment layers 6.

Once the sealing operation is effected, the cell is heated for a prolonged period of time, for example for 1 hour, at a temperature of approximately 250° C. for example, which simultaneously polymerizes the resin of the frame 2 and the polyimide alignment layers 6. Care should be taken to select two materials for the frame 2 and layers 6 such that the polymerization temperatures thereof are not too far separated from one another, for it is of course necessary to heat to the temperature corresponding to the higher polymerization temperature.

This heating operation is very important because it produces a copolymerization between the sealing frame 2 and the alignment layers 6, which involves a chemical bonding between these elements to form an integral casing for the liquid crystal 7. This casing completely protects the liquid crystal 7 from any contamination and against external influences.

When the frame 2 is applied by the silk screen process a passage through it is provided, by techniques know per se, which permits the inside enclosure to be filled with crystal. This passage is then sealed after the cell has been filled, such sealing likewise employing techniques know per se.

In order to allow the supply of electricity to the cell, the latter is constructed by making one of the glass plates 1 larger than the other, so that the electrode connections are externally accessible. Since, during the manufacturing process, the bonding and alignment layers have been deposited over the entire surface of the glass, thus covering the electrodes, it is necessary in a later operation to eliminate these two layers by engraving of the external surface carrying the connections of the electrodes.

Due to the fact that the material of the bonding layers 5 can be selected more freely than is the case with the alignment layers 6, a good chemical bond between each of the bonding layers 5 and the alignment layer 6 with which it is in contact can be obtained. Thus, there is a perfect chemical bond between each of the alignment layers 6 and the corresponding bonding layer 5 on the one hand, and between the latter and the protective layer 3 on the other hand. It should be noted that this bonding and the chemical bond between the sealing frame 2 and the alignment layer 6 are such that, with mass-production which enables several cells to be produced simultaneously, these bonds are not jeopardized when the glass plates are broken up in order to separate the individual cells one from another.

The quality of these chemical bonds is especially important when the cell is subjected to harsh climatic conditions, especially to humid conditions, in order to maintain a seal such that the protection afforded for the liquid crystal 7 is ensured. It will be recalled that the consequence of the liquid crystal being affected by humidity is an increase in the consumption of control current by the cell. Moreover, it may cause loss of alignment of the liquid crystal molecules.

It is advisable to point out again that the superposition of the alignment layers 6 and the bonding or linking layers 5 leads to good protection for the liquid crystal of the cell in respect of direct currents, which originate from the fact that the sum of the positive and negative control impulses of the cell is never absolutely zero and thus a positive or negative resultant is always present. This protection in respect of direct currents is due to the fact that the layers 5 and 6 together form a capacitance which is of sufficiently low impedance not to produce a significant potential drop.

It should also be noted that the casing which is formed by the alignment layers 6 and the sealing frame 2 is completely neutral in relation to the liquid crystal 7, because of the perfect polymerization of the materials of these three elements. The plastics material used for the alignment layers is never neutral, as such, in relation to the liquid crystal which in fact constitutes a solvent of that material.

With the present invention, it is thus possible to produce a display cell with a sealing frame composed of plastics material which, by comparison with sealing frames of calcinated glass (so-called GLASSFRIT), has the advantage of not requiring heating of the cell to a relatively high temperature which would induce the diffusion of ions originating from the glass of the plates and of impurities which diffuse from the actual material of the frame, while retaining the advantages of calcinated glass as normally compared with plastics material, which mainly consist of better imperviousness and facility of manufacture.

It should be noted that the use of protective layers such as the layers 3, which are intended to prevent the diffusion of ions harming the alignment of the molecules of the liquid crystal, is already known per se, but that up to the present time these layers have been placed above the electrodes and not directly on the plates forming substrata. Placed on the electrodes, the protective layers create an impedance on each plate which induces losses of potential which unfavourably affect the contrast/potential curve, this curve having a tendency to become flattened. However, this curve must have a very steep zone, especially in a case where the cell is controlled in multiplex fashion.

We claim:

1. A passive electro-optic display cell comprising two glass plates, a frame positioned between the plates and by which the plates are maintained at a fixed spacing one from the other to provide an enclosed space surrounded by said frame, a liquid crystal imprisoned within said space, control electrodes respectively carried by said plates on the facing inner sides thereof and, on the inner side of each electrode, an alignment layer for alignment of the molecules of an active constituent of said liquid crystal, said frame and said alignment layers being composed of polymerizable substances said substances having been polymerized simultaneously to produce interpolymerization thereof resulting in close chemical bonding between said frame and said alignment layers which thus together form a wall which completely encloses the liquid crystal and shelters it from external influences.

2. A display cell as claimed in claim 1, further comprising a bonding layer of transparent organic material placed between each said plate and the alignment layer thereon, said bonding layer having the effect of producing a chemical linkage with the alignment layer on the one hand, and with the plate on the other hand.

3. A display cell as claimed in claim 1, wherein each said alignment layer comprises a polyimide.

4. A display cell as claimed in claim 2, wherein each said bonding layer comprises an organic silane.

5. A display cell as claimed in claim 2, wherein said alignment and bonding layers on each said plate together have a thickness which lies in the range of 50 to 500 A.

6. A display cell as claimed in claim 2, further comprising a protective layer of transparent inorganic material placed between each said plate and the electrodes thereof, such protective layer serving to prevent diffusion into the cell of ions originating from that glass plate.

7. A method of manufacture of a display cell comprising the steps of applying a protective layer of transparent inorganic material to each of two glass plates, placing a film of electrically conductive material on each such protective layer, selectively removing a part of said conductive layer on at least one of said two plates by photochemical means, leaving a conductive network providing electrodes and electrical connecting tracks thereto, placing a bonding layer made of a transparent organic material on each of the plates thus treated, depositing an alignment layer for the alignment of the molecules of a liquid crystal of the cell on said bonding layer of each said plate, said alignment layer being produced from a polymerizable material in the non-polymerized state, immediately thereafter effecting rubbing of each alignment layer in a direction such that when the plates are assembled together the directions of rubbing of the two alignment layers thereof are mutually perpendicular, depositing a frame polymerizable plastics material in the non-polymerized state on one of the plates, a passage through from the outside to the inside thereof being provided in this frame, assembling the plates with the frame between them, heating the assembly to soften the material of said frame and adjusting the spacing of the plates with the frame so softened, heating the assembly at a higher temperature to produce interpolymerization of the material of the alignment layers with that of the frame and close chemical bonding there therebetween, thus providing an impervious casing of the cell, filling the inside of said casing with liquid crystal through said passage already provided in said frame, and sealing that passage in an impervious manner.

8. A passive electro-optic display cell produced by the method of claim 7.

9. The method of claim 7 wherein the alignment layer is comprised of polyimide.

10. The display cell of claim 8, wherein the alignment layer is comprised of polyimide.

* * * * *